Dec. 1, 1970  J. C. GEBHARD, JR  3,544,416
COMBINATION OF A PLASTIC SHEET MEMBER AND FASTENING MEANS
FOR SECURING SAID MEMBER TO A SUPPORTING STRUCTURE
Filed July 31, 1967
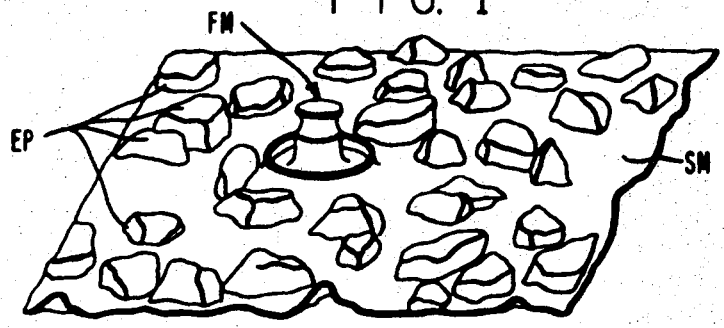
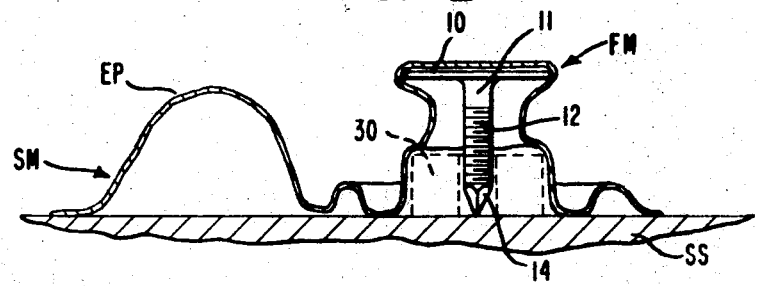
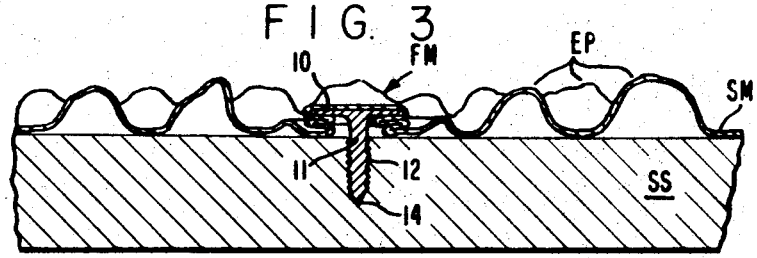
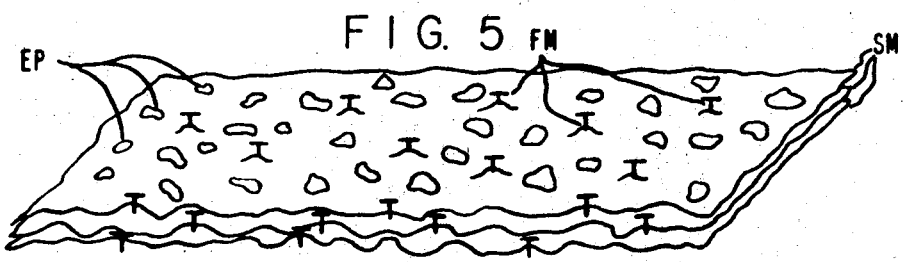
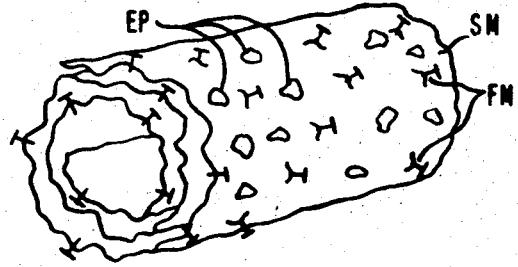
INVENTOR
JOHN CHARLES GEBHARD, JR.
BY *Harry C. Braddock*
ATTORNEY United States Patent Office 3,544,416
Patented Dec. 1, 1970

3,544,416
COMBINATION OF A PLASTIC SHEET MEMBER AND FASTENING MEANS FOR SECURING SAID MEMBER TO A SUPPORTING STRUCTURE
John Charles Gebhard, Jr., West Chester, Pa., assignor to E. I. du Pont de Nemours and Company, Wilmington, Del., a corporation of Delaware
Filed July 31, 1967, Ser. No. 657,335
Int. Cl. B32b 3/06; E04b 1/38
U.S. Cl. 161—48      7 Claims

ABSTRACT OF THE DISCLOSURE

The combination of a flexible plastic sheet member and fastening means for securing the member to a supporting structure, the fastening means comprising; a plurality of pointed penetrating elements movably secured to one side of the sheet member for movement relative to the sheet member between a retracted inoperative fastening position and an extended position for operative fastening engagement with a supporting structure, said elements not penetrating or extending through the sheet member at any time and arranged to be moved into operative fastening engagement with a supporting structure by application of force to said elements through the sheet member from the other side thereof.

CROSS REFERENCES TO RELATED APPLICATIONS

U.S. Pat. No. 3,131,514, Great Britain Pat. No. 6,256 of Mar. 13, 1913.

INTRODUCTION

This invention relates generally to means for effectively solving the problem of securing plastic sheet members in position on supporting structures. It relates more specifically to an improved flexible roofing or siding sheet members in combination with penetrating type fastener elements.

It is an object of the invention to provide a novel roofing or siding sheet member-fastener element combination which is more economical, effective, convenient, and reliable than conventional products of this type not only as to installation and performance, but also as to manufacture, storage, and shipment.

Other objects and advantages will be apparent from a consideration of the following specification, claims, and accompanying drawings.

BACKGROUND OF THE INVENTION

The most generally known and used method of applying flexible roofing or siding sheets to supporting structures involves positioning the sheets against the support structure and then driving a headed fastener such as a nail through the sheet into the supporting structure. There are many problems relating to this method, some involving maintaining an effective weather seal around the nail, some relating to the relatively slow process of positioning and driving the nails through the sheet into the support structure, and others having to do with ineffective design of nails such as those used in roofing sheets. In connection with this latter point, it has been determined that relative to the force required to tear the roofing loose around the nail head, the shanks of conventional nails such as those used in roofing are much longer and have greater surface area than is necessary or desirable. It has been determined that the limiting factor on the size of the shank of a nail such as used in roofing is actually the minimum length which can be held between the worker's fingers while positioning and starting to drive the nail. This results in unnecessary undesirable cost. In addition elimination of the need to use both hands to position and drive nails while working at elevated locations could improve conventional construction practice significantly, not only from the standpoint of rapid efficient installation but also from the standpoint of safety.

There are also known in the prior art, roofing and siding sheet elements which have fastening elements formed or embedded therein, representative disclosures being U.S. Pat. 3,131,514 and British Pat. No. 6,256 of Mar. 13, 1913. However these fastening elements are not of the driven type and due to the projecting elements present problems in storage, shipment, and handling on the job. One of the problems with such sheet elements occurs when the sheet elements are stored or packed for shipment. It is difficult to prevent the protruding fastener elements from damaging adjacent sheet elements under the forces of stacking for storage and shipment.

The improved plastic sheet member and fastening means combination of the invention is adapted for economical rapid mass production, convenient storing and shipping arrangements, easy rapid installation and effective functioning in use. Since the fastening elements in the manufactured combination have their penetrating points in a retracted position, the combination plastic sheet member and fastening means may be rolled, folded, and stacked for storage or shipment without the penetrating points damaging the adjacent layers of the sheet member. Installation is simple, rapid, and efficient, the sheet member merely placed in position on a supporting structure and the fastening elements, being properly positioned and aligned for driving, can be directly driven into holding engagement with the supporting structure by force applied through the sheet member. The proper number and spacing of the fastening elements is established and insured by the combination design. Since it is easy to recognize which fastener elements have been driven by observing the undriven elements position or projection above the supporting structure, there is no problem of failing to notice or drive any fastener element and leaving an unsecured gap along the sheet member. When in place the fastener elements positively secure the sheet member in position without penetrating or extending through the sheet member. In roofing and siding installations this eliminates leaks around fastener elements and the need to seal around fastening elements which extend through the sheet member being secured in position.

In the drawings,

FIG. 1 is a partial perspective view of a roofing or siding sheet member and fastening means combination embodying the principles of the invention, the sheet member provided with an optional deep-embossed simulated pebble pattern.

FIG. 2 is an enlarged partial cross sectional view of the sheet member-fastening means combination shown in FIG. 1 illustrating the fastening means pointed penetrating element in retracted position relative to the sheet member and out of an operative fastening engagement with the supporting structure shown.

FIG. 3 is a partial cross sectional view similar to that of FIG. 2 showing the pointed penetrating element of the fastening means in extended position and in operative holding or securing engagement with the supporting structure.

FIG. 4 is a general schematic view of a sheet member and fastening means combination of the type shown in FIG. 1, being rolled up for storage or shipment, showing how the limited nesting action occurs between the layers of the sheet member.

FIG. 5 is a general schematic view of a sheet member and fastening means combination similar to that shown in FIG. 4 except that a plurality of layers of the combination are stacked one on the other to provide a multi-layer package for storage or shipment.

In FIGS. 1, 2 and 3 there is shown a portion of a sheet member SM suitable for use as roofing or siding in combination with fastening means FM. The sheet member may be formed of suitable flexible plastic materials such as polyfluorinated or polychlorinated hydrocarbons, polypropylene, polyethylene, synthetic rubbers, and elastomers and filled systems of any of these. The sheet member may be in the general range of about 10 to about 50 mils in thickness. It is also possible that other flexible materials such as copper, aluminum, and combinations of these with plastic layers may be satisfactorily used to practice the invention. The sheet member SM may be provided with embossed portions EP to provide a suitable aesthetic pattern such as simulated pebbles. The sheet member SM is shown in FIGS. 2 and 3 with its lower surface in engagement with a supporting structure SS. As shown in FIGS. 2 and 3 a recess is formed in the sheet member SM opening on the lower surface. A fastener assembly comprising a relatively long tapered point 14, a shank portion 11, and an enlarged head portion 10 is positioned within the recess. The head portion 10 is positioned within the recess. The head portion 10 is held in position in the bottom or internal limit of the recess by positive engagement with a reentrant portion of the sheet member forming the recess, as shown in FIG. 2. The fastener assembly is shown with its pointed end 14 in retracted position in FIG. 2, in which position the fastener assembly is inoperative as far as operative holding engagement with the supporting structure SS is concerned. However the fastener assembly is shown in proper alignment and position to be forced into operative holding engagement with structure SS upon application of a sufficient driving force in the direction of the arrow in FIG. 2 from the other side of the sheet member. Upon the application of such a force the pointed end 14 of the fastener assembly moves into its position of operation holding or securing engagement with the supporting structure as seen in FIG. 3, without any portion of the fastener assembly extending through or penetrating through the sheet member. The shank portion 11 of the fastener assembly is preferably provided with annular serrations or ridges at 12 to improve its holding power. The fastener assembly is preferably made of a suitable metal such as aluminum with the relatively long tapered point as mentioned previously and an enlarged head 10, the upper part of which forms an impact or force-receiving area. The length of the shank portion is generally no longer than about five-eighths of an inch in order to provide adequate holding power in supporting structures such as wood. This is a shank length well below that which can conveniently be held by fingers during positioning and driving. When the fastener assembly is made of aluminum the shank portion 11 joins the head portion 10 in a relatively large radius fillet, and the edges of the head portion are somewhat flexible and smoothly rounded to avoid damaging or cutting through the material of the sheet member during the driving operation. The size of the impact or force receiving area of the head portion 10 of the fastener assembly, the sharpness of the pointed end 14, and the properties and size of both the sheet member and fastener means are predetermined such that sufficient force can be applied to the head portion 10 through the sheet member from the other side thereof to drive the pointed end into a supporting structure such as wood without significant damage to the sheet member or fastener assembly. The preferred installation technique involves positioning the combination sheet member and fastening means as desired on a supporting structure and then driving the fastener assembly pointed end into operative holding engagement with the supporting structure by use of a standard roofer's hammer which is provided with a soft plastic head cover element of known construction. However, it is possible to use an unmodified hammer of conventional design to apply the sheet member-fastener means combination of the invention without significant damage.

As shown in FIGS. 4 and 5, multi-layer stacks of the combination of the invention may be prepared for storage or shipment without the danger of the pointed ends of the fastener assembly damaging the adjacent surfaces of the engaged layers, and without destroying the proper relative positioning of fastening assembly and sheet member for rapid driving of the pointed ends of these assemblies when the sheet member is positioned on a support structure.

The combination of the invention may conveniently be prepared by vacuum forming sheets of suitable material over a heated male mold which, in addition to the optional pebbled pattern surface, is provided with integrally formed annular bushings suitably spaced, in which are loosely positioned the fastener assemblies. The position of such a bushing and its fastener assembly during manufacture can be visualized by referring to FIG. 2 at reference numeral 30, which illustrates how it would appear on a vacuum mold surface which could be represented by the structure SS. When the sheet member is laid over the vacuum mold surface with the fastener assemblies positioned in the bushings, and the heat and vacuum applied according to known vacuum molding arrangements, the softened sheet member is drawn down around the head portions of the assemblies and into engagement with the mold which may or may not have a pattern formed therein. Due to the vacuum the softened sheet member is formed around the enlarged head portion of the fastener assembly as shown in FIG. 2, the reentrant portion formed around the head portion 10 creating a positively engaged arrangement securing the fasteners assembly to the sheet member at the bottom or extremity of the recess. After the molded sheet member has cooled and returned to its more rigid condition, the molded sheet member, with its positively engaged recessed fasteners assemblies, is removed from the mold and is ready for storage, shipment, or installation.

It is believed that the features of the combination and their functioning and their advantages are apparent from the foregoing description and discussion. It further appears that applicant has provided a novel improved sheet member-fastening means in accordance with the objects of this invention.

Although a preferred embodiment has been described in detail in accordance with the Patent Law, certain modifications and variations within the spirit of the invention will occur to those skilled in the art, and all such are considered to fall within the terms of the following claims.

What is claimed is:

1. An improved combination of a sheet member of plastic material and fastening means for securing said sheet member to a supporting structure, said combination comprising a flexible sheet member having predetermined characteristics, and of a given length, width, and thickness, said sheet member comprising a continuous unbroken portion in which is formed a recess opening on the surface of one side of said sheet member, said combination further comprising a fastener assembly comprising a pointed penetrating element of predetermined sharpness and a securing means for non-penetrating engagement with the surface of said one side of said sheet member, said fastener assembly positioned in, substantially contained within said recess, and secured in position by engagement of said securing means with said surface of said one side of said sheet member, said fastener assembly and the portion of said sheet member forming said recess constructed, arranged, and cooperating to retain the pointed penetrating element of said fastener assembly in a first retracted position generally within the recess and out of operative engagement with a supporting structure engaging said surface of said one side of said sheet member, said fastener assembly and said portion of said sheet member forming the recess further cooperating, constructed, and arranged to permit deformation of the walls of said recess and relative movement of said pointed element outwardly of the open end of said recess and into operative engagement with a supporting structure against which said surface of the sheet member is positioned in order to secure the sheet member in position on such a supporting structure without said fastener assembly or its pointed element extending through or penetrating through the unbroken portion of the sheet member.

2. The improved combination of claim 1 in which said recess formed in said surface of said portion of said sheet member comprises an enlarged portion and a restricted portion positioned between the enlarged portioned and said surface of said one side of said sheet member, the securing means of said fastener assembly comprising an enlarged structure corresponding to the enlarged portion of said recess and closely fitted therein for positive holding engagement with said sheet member.

3. The improved combination of claim 1 in which said fastener assembly comprises a relatively short nail member having an enlarged head portion with a given impact force-receiving area and a given head thickness, said nail member further provided with a straight shank portion joined at one end to said head portion and having at its other end a relatively sharp long tapered point, said recess extending in a direction substantially perpendicular to the general plane of the surface of the portion of the sheet member surrounding said recess, said head portion of the fastener assembly being positioned in the bottom of said recess and held in position by positive engagement with a reentrant portion of the sheet member forming said recess such that said nail member is substantially completely contained in said recess with said shank portion extending in a direction substantially perpendicular to the general plane of the portion of the sheet member surounding said recess, the given area of the impact force-receiving area of said head portion, the sharpness of said point, and the properties and thickness of said unbroken portion of said sheet member being such that sufficient force can be applied to said head portion through said sheet member from the other side thereof, to drive the pointed end of said nail member into operative holding engagement with a supporting structure without significant damage to said sheet member, or said nail member or to the positive engagement of said head portion with the recessed portion of said sheet member.

4. The combination of claim 3 in which the given thickness and external contours of said head portion and the material of which said head portion is formed are selected so that under application of force through said sheet member to drive said nail member, said head member is capable of limited deformation to minimize shearing or cutting of said sheet member during application of said force.

5. The combination of claim 4 in which said shank portion has a length and surface characteristics to give sufficient holding power in the desired supporting structure, said length being less than that required to permit holding by fingers during driving of said nail member.

6. The combination of claim 5 in which said shank portion joins said head portion at a smoothly rounded annular zone of intersection and the length of said shank portion is no greater than about five-eighths of an inch.

7. An improved combination of a sheet member of plastic material and fastening means for securing said sheet member to a supporting structure, said combination comprising a flexible sheet member having predetermined characteristics, and of a given length, width, and thickness, said sheet member comprising a continuous unbroken portion in which is formed a recess opening on the surface of one side of said sheet member, said recess comprising an enlarged portion and a restricted portion formed by a reentrant section of the walls of said recess and positioned between the enlarged portion and the open end of said recess, said combination further comprising a fastener assembly comprising a pointed penetrating element of predetermined sharpness and an enlarged structure coresponding to the enlarged portion of said recess and fitted therein for non-penetrating engagement with the surface of said one side of said sheet member, said fastener assembly positioned in and substantially contained within said recess, said fastener assembly and the portion of said sheet member forming said recess constructed, arranged, and cooperating to retain the pointed penetrating element of said fastener assembly in a first retracted position generally within the recess and out of operative engagement with a supporting structure engaging said surface of said one side of said sheet member, said fastener assembly and said portion of said sheet member forming the recess further cooperating, constructed, and arranged to permit deformation of the walls of said recess and relative movement of said pointed element outwardly of the open end of said recess and into operative engagement with a supporting structure against which said surface of the sheet member is positioned in order to secure the sheet member in position on such a supporting structure without said fastener assembly or its pointed element extending through or penetrating through the unbroken portion of the sheet member, the walls of said recess being adapted in a manner such that relative movement of said pointed element outward of the open end of said recess is accompanied by a collapsing of the walls of said recess in accordian fashion so that a number of reentrant portions of the walls of said recess are squeezed between the enlarged structure of said fastener assembly and said supporting structure.

References Cited

UNITED STATES PATENTS

| | | | |
|---|---|---|---|
| 773,306 | 10/1904 | Wadsworth | 161—48 |
| 1,770,439 | 7/1930 | Thompson | 156—91 |
| 2,195,905 | 4/1940 | Stanley | 52—511 XR |
| 2,724,303 | 11/1955 | Holcomb | 52—543 XR |
| 3,131,514 | 5/1964 | Siek. | |

FOREIGN PATENTS 6,256   8/1913   Great Britain.

JOHN T. GOOLKASIAN, Primary Examiner

D. J. FRITSCH, Assistant Examiner

U.S. Cl. X.R.

52—316, 511, 543; 161—54, 125, 127, 138